US009325006B2

(12) United States Patent
Cho et al.

(10) Patent No.: US 9,325,006 B2
(45) Date of Patent: Apr. 26, 2016

(54) METHOD FOR PREPARING POSITIVE ACTIVE MATERIAL FOR LITHIUM ION SECONDARY BATTERY, POSITIVE ACTIVE MATERIAL PREPARED THEREBY, AND LITHIUM ION SECONDARY BATTERY INCLUDING THE SAME

(75) Inventors: Yun Ju Cho, Chungcheongnam-do (KR); Pil Sang Yun, Chungcheongnam-do (KR); Mi Sun Lee, Chungcheongnam-do (KR); Hae In Cho, Chungcheongnam-do (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 750 days.

(21) Appl. No.: 13/449,109

(22) Filed: Apr. 17, 2012

(65) Prior Publication Data

US 2012/0282528 A1 Nov. 8, 2012

(30) Foreign Application Priority Data

May 2, 2011 (KR) ........................ 10-2011-0041388

(51) Int. Cl.
| | |
|---|---|
| *H01M 4/485* | (2010.01) |
| *H01M 2/14* | (2006.01) |
| *H01M 4/505* | (2010.01) |
| *C01D 1/20* | (2006.01) |
| *C01D 1/22* | (2006.01) |
| *C01G 1/02* | (2006.01) |
| *H01M 4/525* | (2010.01) |

(52) U.S. Cl.
CPC ................. *H01M 4/505* (2013.01); *C01D 1/20* (2013.01); *C01D 1/22* (2013.01); *C01G 1/02* (2013.01); *H01M 4/525* (2013.01); *Y02E 60/122* (2013.01)

(58) Field of Classification Search
CPC ..... H01M 4/505; H01M 4/525; H01M 4/485; C01D 1/20; C01D 1/22; C01G 1/02; C01G 51/42; C01G 51/44
See application file for complete search history.

(56) References Cited

U.S. PATENT DOCUMENTS

| 5,366,943 | A | * | 11/1994 | Lipowitz et al. ............. 501/95.1 |
|---|---|---|---|---|
| 5,851,693 | A | * | 12/1998 | Sano et al. ..................... 429/174 |
| 5,874,058 | A | | 2/1999 | Sheargold et al. |
| 6,311,521 | B1 | * | 11/2001 | Mifune et al. ................... 65/17.4 |
| 2001/0046466 | A1 | * | 11/2001 | Yoshio et al. ................... 423/266 |
| 2005/0271576 | A1 | * | 12/2005 | Awano .................... C01G 51/42 423/594.6 |
| 2007/0072062 | A1 | * | 3/2007 | Fukui ...................... H01M 2/22 429/94 |
| 2008/0102372 | A1 | * | 5/2008 | Ohishi .................... H01M 4/04 429/231.95 |
| 2010/0183924 | A1 | * | 7/2010 | Song et al. ..................... 429/221 |
| 2011/0020711 | A1 | * | 1/2011 | Okano .................. H01M 4/364 429/337 |
| 2011/0038096 | A1 | * | 2/2011 | Naito ...................... C04B 35/20 361/321.4 |
| 2011/0076534 | A1 | * | 3/2011 | Kobayashi .......... H01M 2/0225 429/94 |

FOREIGN PATENT DOCUMENTS

| EP | 2 584 632 A1 | 4/2013 |
|---|---|---|
| JP | 09-270260 A | 10/1997 |
| JP | 2001-302248 A | 10/2001 |
| JP | 2001-335323 A | 12/2001 |
| JP | 2010-219064 A | 9/2010 |
| KR | 2000-010904 A | 2/2000 |

OTHER PUBLICATIONS

Korean Notice of Allowance issued in Korean Patent Application No. 10-2011-0041388 dated Sep. 20, 2012.
Office Action issued in corresponding Chinese Application No. 201210134528.9 dated Jan. 24, 2014 (7 pages).

* cited by examiner

*Primary Examiner* — Ula C Ruddock
*Assistant Examiner* — Amanda Barrow
(74) *Attorney, Agent, or Firm* — Lee & Morse, P.C.

(57) ABSTRACT

A method for preparing a positive active material for a lithium ion secondary battery, the method including obtaining a mixture by mixing a lithium containing compound and metal oxide, distributing powder of a lithium containing compound into a furnace, and heat treating the mixture in the furnace, wherein a thermal decomposition temperature of the lithium containing compound power distributed into the furnace is lower than that of the lithium containing compound mixed with the metal oxide.

3 Claims, No Drawings

METHOD FOR PREPARING POSITIVE ACTIVE MATERIAL FOR LITHIUM ION SECONDARY BATTERY, POSITIVE ACTIVE MATERIAL PREPARED THEREBY, AND LITHIUM ION SECONDARY BATTERY INCLUDING THE SAME

CROSS-REFERENCE TO RELATED APPLICATION

This application claims priority to and the benefit of Korean Patent Application No. 10-2011-0041388, filed on May 2, 2011, the entire content of which is incorporated herein by reference.

BACKGROUND OF THE INVENTION

1. Field of the Invention

Aspects of the present invention relate to a method for preparing a positive active material for a lithium ion secondary battery, and more particularly, to a method for preparing a positive active material for a lithium ion secondary battery, which can improve life and safety characteristics of the battery by minimizing byproducts such as $Li_2CO_3$ and LiOH, a positive active material prepared thereby, and a lithium ion secondary battery including the same.

2. Description of the Related Art

Due to recent trends toward more compact and lighter portable electronic equipment, such as cellular phones, camcorders and notebook computers, there has been a growing demand for improved lithium ion secondary batteries of high performance, durability and reliability that can be used as power sources for the electronic equipment. In addition, as realization of electromotive vehicles is keenly interested, lithium ion secondary batteries are drawing particular attention as power sources for the electromotive vehicles.

A lithium ion secondary battery generally includes a positive electrode and a negative electrode that are capable of intercalating and deintercalating lithium ion, a separator that prevents the positive electrode and the negative electrode from physically contacting each other, and an organic electrolyte or polymer electrolyte that transmits lithium ion between the positive and negative electrodes. In the lithium ion secondary battery, when lithium ion is intercalated/deintercalated in the positive electrode and the negative electrode, electrical energy is generated through an electrochemical oxidation/reduction reaction.

In the general method for manufacturing a positive electrode, a lithium containing compound and metal oxide are mixed and heat treated at high temperature to prepare a positive active material. Next, the positive active material is mixed with a binder such as a PVDF resin in a solvent to prepare a slurry. The slurry is coated on both surfaces of a positive current collector made of, for example, an aluminum foil, and dried to prepare a positive electrode.

In order to provide for shortage in the amount of lithium contained in the positive active material due to volatilization of lithium ions during heat treating at high temperature in the course of manufacturing the positive electrode, a molar ratio of the lithium containing compound to the metal oxide is controlled such that an excess of the lithium containing compound is used relative to the metal oxide. For the reason stated above, some of the excessively used lithium compound is mostly diffused into the metal oxide, some of the lithium compound is volatilized, and the remainder on a surface of the metal oxide without being diffused into a metal crystal lattice is used to generate byproducts such as LiOH, $LiHCO_3$, or $Li_2CO_3$ with $H_2O$ and $O_2$ generated during a calcinating process.

In a case where excessive lithium ions exist on the surface of the lithium metal oxide as the positive active material without being intercalated/deintercalated into/from the metal crystal lattice even after repeated charge/discharge cycles, the excessive lithium ions may be dissolved or precipitated, causing dendrite growth. This may cause a short circuit and may further cause serious problems with the life and safety of the battery.

BRIEF SUMMARY OF THE INVENTION

An aspect of the present invention provides a method for preparing a positive active material for a lithium ion secondary battery having a reduced amount of LiOH or $Li_2CO_3$ as a byproduct.

Other aspects of the present invention provide a positive active material prepared by the manufacturing method, and a lithium ion secondary battery including the same, having improved life and safety characteristics.

In accordance with one aspect of the present invention, there is provided a method for preparing a positive active material for a lithium ion secondary battery, the method including obtaining a mixture by mixing a lithium containing compound and metal oxide, distributing powder of a lithium containing compound into a furnace, and heat treating the mixture in the furnace, wherein a thermal decomposition temperature of the lithium containing compound power distributed into the furnace is lower than that of the lithium containing compound mixed with the metal oxide.

In one embodiment of the present invention, the lithium containing compound may be at least one selected from the group consisting of lithium hydroxide, lithium carbonate, lithium nitrate and lithium acetate.

In one embodiment of the present invention, the powder of the lithium containing compound may be used in an amount of 0.5 to 1.5 parts by weight based on 100 parts by weight of the lithium containing compound mixed with the metal oxide.

In one embodiment of the present invention, the heat treating may be performed at a temperature in a range of 700 to 1000° C. for 10 to 30 hours.

In accordance with another aspect of the present invention, there is provided a positive active material for a lithium ion secondary battery, the positive active material prepared by the method according to the aspect of the present invention.

In accordance with still another aspect of the present invention, there is provided a lithium ion secondary battery including the positive active material prepared by the method according to the aspect of the present invention, the lithium ion secondary battery comprising a positive electrode, a negative electrode, a separator, and an organic electrolyte.

As described above, according to the present invention, since an amount of a byproduct such as LiOH or $Li_2CO_3$ is reduced, oxygen generation due to decomposition of the byproduct is suppressed, so that there is little change in the internal pressure of the battery even after high-temperature long-period charge/discharge tests. In addition, since dendrite formation does not occur, the positive active material can improve the safety and life characteristics of the battery.

Additional aspects and/or advantages of the invention will be set forth in part in the description which follows and, in part, will be obvious from the description, or may be learned by practice of the invention.

DETAILED DESCRIPTION OF THE INVENTION

Hereinafter, embodiments of the present invention will be described in detail.

The present invention is directed to a method for preparing a positive active material for a lithium ion secondary battery, the method including obtaining a mixture by mixing a lithium containing compound and metal oxide, distributing powder of a lithium containing compound into a furnace, and heat treating the mixture in the furnace, wherein a thermal decomposition temperature of the lithium containing compound power distributed into the furnace is lower than that of the lithium containing compound mixed with the metal oxide.

The lithium containing compound is a compound that is generally used in a positive active material for a lithium ion secondary battery, and examples thereof may include lithium hydroxide, lithium carbonate, lithium nitrate and lithium acetate.

The metal oxide is also a metal oxide that is generally used in a positive active material for a lithium ion secondary battery, and examples thereof may include $NiCO_3$, $NiO$, $CoCO_3$, $Co_3O_4$, $MnO_2$, and $Mn_2O_3$.

The manufacturing method of the positive active material according to the present invention includes distributing lithium containing compound powder having a thermal decomposition temperature lower than a lithium containing compound as a raw material into a furnace. By distributing the lithium containing compound powder having a thermal decomposition temperature lower than the lithium containing compound used as the raw material into the furnace, the distributed lithium containing compound powder is decomposed earlier than the lithium containing compound used as the raw material, so that the lithium vapor pressure of the furnace is increased, thereby suppressing volatilization of lithium in the lithium containing compound. Therefore, an amount of the lithium containing compound mixed with the metal oxide is reduced, thereby suppressing byproducts such as $LiOH$, $LiHCO_3$, or $Li_2CO_3$ from being generated after a calcinating process. Lithium metal may be used instead of the lithium containing compound powder. However, undesirably, the lithium metal is readily oxidized in the air and rapidly reacts with moisture in the air.

The lithium containing compound powder is preferably used in an amount of 0.5 to 1.5 parts, more preferably 0.8 to 1.1 parts, by weight based on 100 parts by weight of the lithium containing compound mixed with the metal oxide.

If the amount of the lithium containing compound powder is within the range stated above, generation of the byproducts in the positive active material is suppressed and the safety of the battery can be improved.

The heat treating is a calcinating process and is preferably performed at a temperature in a range of 700 to 1000° C. for 10 to 30 hours, more preferably performed at a temperature in a range of 800 to 900° C. for 12 to 24 hours.

If the heat treating is performed at a temperature lower than 700° C., the positive active material powder has poor crystalinity. Thus, charging and discharging makes it difficult to maintain a stable crystal structure during intercalation/deintercalation of lithium, deteriorating the life of the battery. If the heat treating is performed at a temperature higher than 1000° C., the size of the powder becomes immoderately increased and the powder agglomerates tightly, making a subsequent pulverizing process difficult to perform. Since it is difficult to pulverize the powder, it is also difficult to homogenize the powder with a binder and a conductive agent in preparing the slurry for forming the battery.

The present invention also provides a lithium ion secondary battery including a positive electrode including a positive active material prepared by the manufacturing method according to the present invention, a negative electrode, a separator, and an organic electrolyte.

An electrode used in a lithium ion secondary battery is generally manufactured by forming a slurry by mixing an active material, a binder and a conductive material with a solvent, coating the slurry on an electrode current collector, drying and compressing the slurry-coated electrode current collector.

Since the lithium ion secondary battery has a positive electrode including the positive active material prepared by the manufacturing method according to the present invention, an amount of a byproduct such as $LiOH$ or $Li_2CO_3$ is reduced, thereby improving the safety and life characteristics of the battery.

In the lithium ion secondary battery according to the present invention, as non-limiting examples, natural graphite, artificial graphite, carbon fiber, coke, carbon black, carbon nanotube, fullerene, activated carbon, lithium metal or lithium alloy, may be used as a negative active material.

A current collector of a lithium ion secondary battery collects electrons by electrochemical reactions of active materials or provides electrons necessary for electrochemical reactions.

Any suitable material can be used as the negative current collector as long as it may have conductivity while not causing a chemical change to a battery, and non-limiting examples thereof may include aluminum, copper, nickel, titan, calcined carbon, stainless steel, copper or stainless steel treated with carbon, nickel, titan or silver, and an aluminum-cadmium alloy.

In addition, any suitable positive current collector material can be used as the negative current collector as long as it may have conductivity while not causing a chemical change to a battery, and non-limiting examples thereof may include stainless steel, aluminum, nickel, titan, calcined carbon, and aluminum or stainless steel treated with carbon, nickel, titan or silver.

The bonding property of the active material may be enhanced by forming fine irregularities on a surface of the current collector. In addition, the current collector may be used in various forms, including film, sheet, foil, net, porous body, foams, fibrous nonwoven, and the like.

A binder binds an active material with a conductive material to fix the active material to the current collector, and examples thereof may include polyvinylidenefluoride, polypropylene, carboxymethylcellulose, starch, hydroxypropylcellulose, polyvinylpyrrolidone, tetrafluoroethylene, polyethylene, ethylene-propylene-diene polymer (EPDM), polyvinyl alcohol, styrene-butadiene rubber, or fluoro rubber, which can be generally used for the lithium ion secondary battery.

Any suitable conductive material can be used as the conductive material as long as it may have conductivity while not causing a chemical change to a battery, and non-limiting examples thereof may include artificial graphite, natural graphite, acetylene black, ketjen black, channel black, lamp black, summer black, conductive fiber such as carbon fiber or metal fiber, conductive metal oxide such as titan oxide, powder of metal such as aluminum or nickel, and so on.

An electrolyte of a lithium ion secondary battery is a medium that allows ions to move between positive and negative electrodes, and an organic electrolyte having a lithium salt dissolved in an organic solvent is generally used.

A salt generally used for an electrolytic solution of a lithium ion secondary battery can be used as the lithium salt, and examples thereof may include $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$, which may be used either singly or in combinations within an appropriate range in which the advantages and effects of the present invention are not impaired.

An organic solvent generally used for the lithium ion secondary battery may also be used in the present invention. Examples of the organic solvent may include ethylene carbonate, propylene carbonate, dimethyl carbonate, diethyl carbonate, methylpropyl carbonate, ethylpropyl carbonate, methylethyl carbonate, butylene carbonate, dimethylsulfoxide, acetonitrile, dimethoxyethane and diethoxyethane, and may be used either singly or in combinations within an appropriate range in which the advantages and effects of the present invention are not impaired.

The separator disposed between the positive electrode and the negative electrode, prevents an electrical short between the two electrodes and serves as a path of ion transfer. Non-limiting examples of the separator may include single olefin substance such as polyethylene (PE) or polypropylene (PP), or composite olefins, polyamide (PA), poly(acrylonitrile) (PAN), poly(ethylene oxide) (PEO), poly(propylene oxide) (PPO), poly(ethylene glycol)diacrylate (PEGA), polytetrafluoroethylene (PTFE), polyvinylidenfluoride (PVdF), or polyvinylchloride (PVC).

The lithium ion secondary battery according to the present invention can be manufactured by the general method well known in the related art. In addition, the lithium ion secondary battery according to the present invention may have general shapes, including a coin type, a button type, a sheet type, a cylinder type, a planar type, and a prismatic type.

Embodiment examples of the present invention and comparison examples will be explained below, but the present invention is not limited thereto.

Example 1

$Li_2CO_3$ and $MnO_2$ as an electrolytic manganese dioxide (EMD) were mixed in a molar ratio of 1:2. The mixture was put into a furnace and 1 part by weight of LiOH powder based on 100 parts by weigh of $Li_2CO_3$ was distributed into the furnace, followed by heat treating at 850° C. for 12 hours, giving $LiMn_2O_4$ powder.

Example 2

$LiMn_2O_4$ powder was prepared in substantially the same manner as in Example 1, except that 0.1 parts by weight of LiOH powder based on 100 parts by weigh of $Li_2CO_3$ was distributed.

Example 3

$LiMn_2O_4$ powder was prepared in substantially the same manner as in Example 1, except that 2 parts by weight of LiOH powder based on 100 parts by weigh of $Li_2CO_3$ was distributed during heat treating.

Comparative Example 1

$LiMn_2O_4$ powder was prepared in substantially the same manner as in Example 1, except that LiOH powder was not distributed.

Comparative Example 2

$LiMn_2O_4$ powder was prepared in substantially the same manner as in Example 1, except that $Li_2CO_3$ and $MnO_2$ as an electrolytic manganese dioxide (EMD) were mixed in a molar ratio of 1.03:2, and LiOH powder was not distributed.

10 g of $LiMn_2O_4$ powder prepared in each of Examples 1-3 and Comparative Examples 1-2 were added to 90 g of distilled water, followed by stirring for about one hour to filter powder and measuring the pH of a filtrate. In addition, OH group was analyzed by a pH titration method and Li:Mn molar ratios were measured by ICP. The results are shown in Table 1.

TABLE 1

|  | pH | OH group | Li:Mn ratio |
| --- | --- | --- | --- |
| Example 1 | 9.5 | 145 ppm | 1:2 |
| Example 2 | 9.7 | 128 ppm | 1:2 |
| Example 3 | 9.4 | 242 ppm | 1:2 |
| Comparative Example 1 | 11.7 | 640 ppm | 0.98:2 |
| Comparative Example 2 | 12.3 | 750 ppm | 1.01:2 |

As understood from Table 1, in Example 1 in which LiOH powder was distributed when preparing $LiMn_2O_4$ powder, OH group was detected at 145 ppm, confirming that a small amount of LiOH as a byproduct was present in $LiMn_2O_4$ and the Li:Mn ratio was maintained at 1:2.

However, in Comparative Example 1 in which LiOH powder was not distributed when preparing $LiMn_2O_4$ powder, the Li:Mn ratio was 0.98:2, confirming that Li was insufficient. In Comparative Example 2 in which powder was not distributed when preparing $LiMn_2O_4$ powder and excess $Li_2CO_3$ was used, the Li:Mn ratio was 1.01:2 and OH group was detected at 750 ppm, confirming that excessively used $Li_2CO_3$ was used to generate LiOH byproducts in a calcinating process.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A method for preparing a positive active material for a lithium ion secondary battery, the method consisting of:
   obtaining a mixture by mixing at least one lithium containing compound selected from the group consisting of lithium hydroxide, lithium carbonate, lithium nitrate and lithium acetate and at least one metal oxide selected from the group consisting of $NiCO_3$, NiO, $CoCO_3$, $CO_3O_4$, $MnO_2$, and $Mn_2O_3$;
   distributing powder of at least one lithium containing compound selected from the group consisting of lithium hydroxide, lithium carbonate, lithium nitrate and lithium acetate into a furnace; and
   heat treating the mixture in the furnace, wherein a thermal decomposition temperature of the lithium containing compound powder distributed into the furnace is lower than that of the lithium containing compound mixed with the metal oxide.

2. The method of claim 1, wherein the powder of the lithium containing compound is used in an amount of 0.5 to 1.5 parts by weight based on 100 parts by weight of the lithium containing compound mixed with the metal oxide.

3. The method of claim 1, wherein the heat treating is performed at a temperature in a range of 700 to 1000° C. for 10 to 30 hours.

* * * * *